(12) United States Patent
Gluhovsky

(10) Patent No.: US 7,120,567 B2
(45) Date of Patent: Oct. 10, 2006

(54) METHOD AND APPARATUS FOR DETERMINING OUTPUT UNCERTAINTY OF COMPUTER SYSTEM MODELS

(75) Inventor: Ilya Gluhovsky, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 774 days.

(21) Appl. No.: 10/224,178

(22) Filed: Aug. 20, 2002

(65) Prior Publication Data

US 2004/0039559 A1   Feb. 26, 2004

(51) Int. Cl.
*G06F 17/50* (2006.01)
(52) U.S. Cl. ............................................. 703/2
(58) Field of Classification Search ............... 703/21
See application file for complete search history.

(56) References Cited

U.S. PATENT DOCUMENTS 6,772,106 B1 *   8/2004   Mahlke et al. ................ 703/21

OTHER PUBLICATIONS

Koehler et al. "Estimating Functions Evaluated by Simulation: A Bayesian/Analytic Approach".*
Laha et al. "Accurate Low-Cost Methods for Performance Evaluation of Cache Memory Systems".*
Brownstone "The Bootstrap and Multiple Imputations".*
Chick "Bayesian Analysis for Simulation Input and Output".*
"Combining Trace Sampling with Single Pass Methods for Efficient Cache Simulation" Conte et al. Jun. 1996.*

\* cited by examiner

*Primary Examiner*—Hugh Jones
*Assistant Examiner*—Saif Alhija
(74) *Attorney, Agent, or Firm*—Osha Liang LLP

(57) ABSTRACT

A method for generating an uncertainty characterization for a system simulation model, including obtaining system simulation input, wherein the system simulation input comprises a cache simulation output, generating one of the group consisting of a deterministic uncertainty model and a stochastic uncertainty model, using the cache simulation output and the system simulation model for at least one system input configuration, and generating the uncertainty characterization for the system simulation model using one of the group consisting of the deterministic uncertainty model and the stochastic uncertainty model.

8 Claims, 5 Drawing Sheets

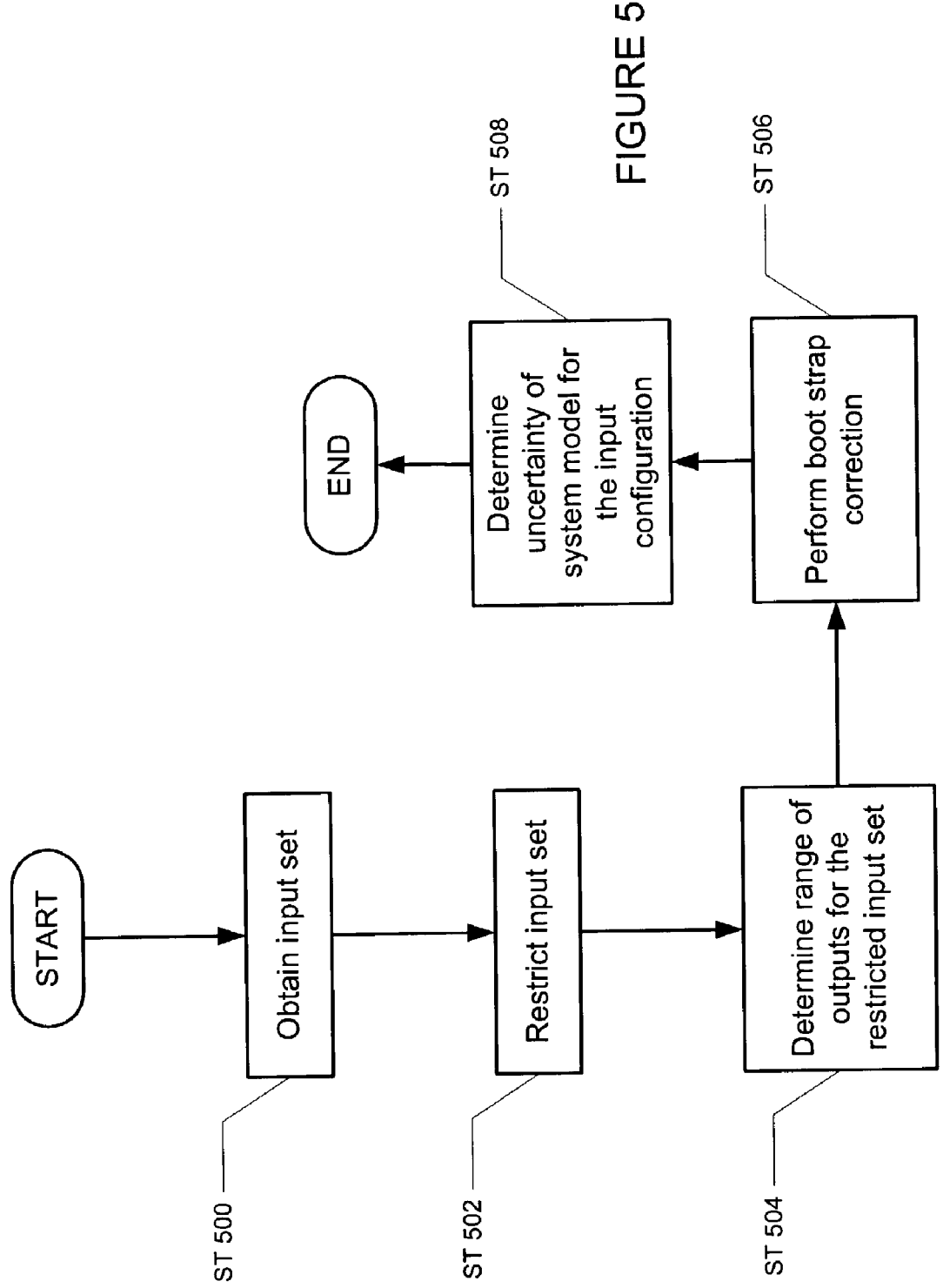

METHOD AND APPARATUS FOR DETERMINING OUTPUT UNCERTAINTY OF COMPUTER SYSTEM MODELS

BACKGROUND OF INVENTION

Generally, a microprocessor operates much faster than main memory can supply data to the microprocessor. Therefore, many computer systems temporarily store recently and frequently used data in smaller, but much faster, cache memory. Many computers use multi-level cache memory systems, where there are many levels of cache, e.g., level one (L1), level two (L2), level three (L3), etc. L1 cache typically is closest to the microprocessor, smaller in size, and faster in access time. Typically, as the level of the cache increases (e.g., from L1 to L2 to L3), the level of cache is further from the microprocessor, larger in size, slower in access time, and supports more microprocessors.

Cache memory architecture may vary in configuration, such as cache size, cache line size, cache associativity, cache sharing, method of writing data to a cache, etc. Cache size refers to the total size of the cache memory. The cache memory is configured to store data in discrete blocks in the cache memory. A block is the minimum unit of information within each level of cache. The size of the block is referred to as the cache line size. The manner in which data is stored in the blocks is referred to as cache associativity. Cache memories typically use one of the following types of cache associativity: direct mapped (one-to-one), fully associative (one-to-all), or set associative (one-to-set).

Cache sharing refers to the manner in which data in the blocks are shared. Specifically, L1 cache sharing is the number of processors (physical or virtual) sharing the L1 cache, i.e., the number of L1 caches sharing one L2 cache; and the number of L2 caches sharing one L3 cache, etc. Most program instructions involve accessing (reading) data stored in the cache memory; therefore, the cache associativity, cache sharing, cache size, and cache line size are particularly significant to the cache architecture.

Likewise, writing to the cache memory (cache write type) is also critical to cache architecture, because the process of writing is generally a very expensive process in terms of process time. Cache memory generally uses one of the following methods when writing data to the cache memory: "write through, no-write allocate" or "write back, write allocate."

The performance of the cache architecture is measured using a variety of parameters, including a miss rate (either load or store), a hit rate, an instruction count, an average memory access time, etc. The miss rate is the fraction of all memory accesses that are not satisfied by the cache memory. There are a variety of miss rates, e.g., intervention, clean, total, "write back," cast out, upgrade, etc. In contrast, the hit rate is the fraction of all memory accesses that are satisfied by the cache memory. The instruction count is the number of instructions processed in a particular amount of time. The average cache access time is the amount of time on average that is required to access data in a block of the cache memory.

Simulation is a useful tool in determining the performance of a particular cache architecture (i.e., a particular cache size, cache line size, cache associativity, etc.). Simulation of a cache memory may be implemented using a computer system. Thus, given a workload trace (a set of sequences of program instructions linked together, which are executed by microprocessors that emulate sets of typical instructions) and the cache architecture, the performance, e.g., hit/miss rates, of the cache architecture may be simulated.

Simulation of the cache architecture typically involves dealing with certain constraints. For example, for a given set of cache architectural components, including a range of possible measurements for each cache architectural component, the number of permutations to fully simulate the cache architecture may be very large, thus introducing a possible constraint upon cache simulation. Also, there are often additional constraints when using simulation. For example, a trace characterizing each level of the number of processors of interest is required. However, some traces may be absent, or short traces that provide realistic scenarios do not sufficiently "warm-up" large cache sizes, i.e., a trace may not be long enough for the simulation to reach steady-state cache rates. In addition, uncertainty in benchmark tuning is another example of constraints in simulation. Additionally, in the interest of time and cost, usually only a small sample set of cache architectures is simulated.

Once the simulation is performed on the small sample set of the cache architecture, statistical analysis is used to estimate the performance of the cache architectures that are not simulated. The quality of the statistical analysis relies on the degree to which the sample sets are representative of the sample space, i.e., permutations for a given set of cache architectural components. Sample sets are generated using probabilistic and non-probabilistic methods. Inferential statistics along with data obtained from the sample set are then used to model the sample space for the given architectural components. Models are typically used to extrapolate using the data obtained from the sample set. The models used are typically univariate or multivariate in nature. The univariate model is analysis of a single variable and is generally useful to describe relevant aspects of data. The multivariate model is analysis of one variable contingent on the measurements of other variables. Further, the models used to fit the data of the sample set may be smoothed models obtained using a plurality of algorithms.

System model simulators are often used in designing computer system architectures. For example, closed queuing networks may be used to create a logical network that models the handling of memory requests made by microprocessors of a multi-processor computer system. A memory request takes a route through the logical network, where the route taken by the memory request is determined in part by inputs to the system model simulator.

FIG. 1 shows the system model simulator (30), which generates a system model output (32) that may be used to predict performance and to help resolve architectural tradeoffs. An input to the system model simulator (30) is workload characteristics, which is generally a cache simulation output (34). The system model simulator (30) also has other inputs (36), which are often fixed, such as cache and memory latencies, or bus widths.

The cache simulation output (34) includes cache operational parameters in the form of rates per instruction for the multi-level cache hierarchy, including a load miss rate, a store miss rate, a load write back rate, and other rate per instruction parameters of the multi-level cache hierarchy. For example, the cache simulation output for a typical cache memory architecture may have a store miss rate of 0.37% and a load miss rate of 0.71%.

Factors such as cache simulation constraints (e.g., benchmark tuning, trace collection, trace warm-up, etc.) may introduce uncertainties into the cache simulation output (34). For example, traces for simulating different set of inputs for different configurations (e.g., for different numbers of microprocessors or for different cache sizes) are often collected by different experts in potentially different settings. The system model output (32) may be affected by such input uncertainties, i.e., uncertainties included in the cache simulation output (34).

SUMMARY OF INVENTION

In general, in one aspect, the invention relates to a method for generating an uncertainty characterization for a system simulation model, comprising obtaining system simulation input, wherein the system simulation input comprises a cache simulation output, generating one of the group consisting of a deterministic uncertainty model and a stochastic uncertainty model, using the cache simulation output and the system simulation model for at least one system input configuration, and generating the uncertainty characterization for the system simulation model using one of the group consisting of the deterministic uncertainty model and the stochastic uncertainty model.

In general, in one aspect, the invention relates to a computer system for generating an uncertainty characterization for a system simulation model, comprising a processor, a memory, and a storage device, and software instructions stored in the memory for enabling the computer system, under the control of the processor, to perform: obtaining system simulation input, wherein the system simulation input comprises a cache simulation output, generating one of the group consisting of a deterministic uncertainty model and a stochastic uncertainty model, using the cache simulation output and the system simulation model for at least one system input configuration, and generating the uncertainty characterization for the system simulation model using one of the group consisting of the deterministic uncertainty model and the stochastic uncertainty model.

In general, in one aspect the invention relates to a method for generating an uncertainty characterization for a system simulation model, comprising obtaining a sparse input set from a sample space input set using an experimental design technique, generating one of the group consisting of a deterministic uncertainty model and a stochastic uncertainty model for each member of the sparse input set to generate a plurality of uncertainty models, and generating an uncertainty characterization for the system simulation model using one of the group consisting of a multivariate fitting routing and a bump-hunting technique.

In general, in one aspect the invention relates to an apparatus for generating an uncertainty characterization for a system simulation model, comprising means for obtaining system simulation input, wherein the system simulation input comprises a cache simulation output, means for generating one of the group consisting of a deterministic uncertainty model and a stochastic uncertainty model, using the cache simulation output and the system simulation model for at least one system input configuration, and means for generating the uncertainty characterization for the system simulation model using one of the group consisting of the deterministic uncertainty model and the stochastic uncertainty model.

Other aspects and advantages of the invention will be apparent from the following description and the appended claims.

BRIEF DESCRIPTION OF DRAWINGS

FIG. 5 illustrates a flow chart for generating a deterministic uncertainty model in accordance with one embodiment of the invention.

DETAILED DESCRIPTION

Figure 1:
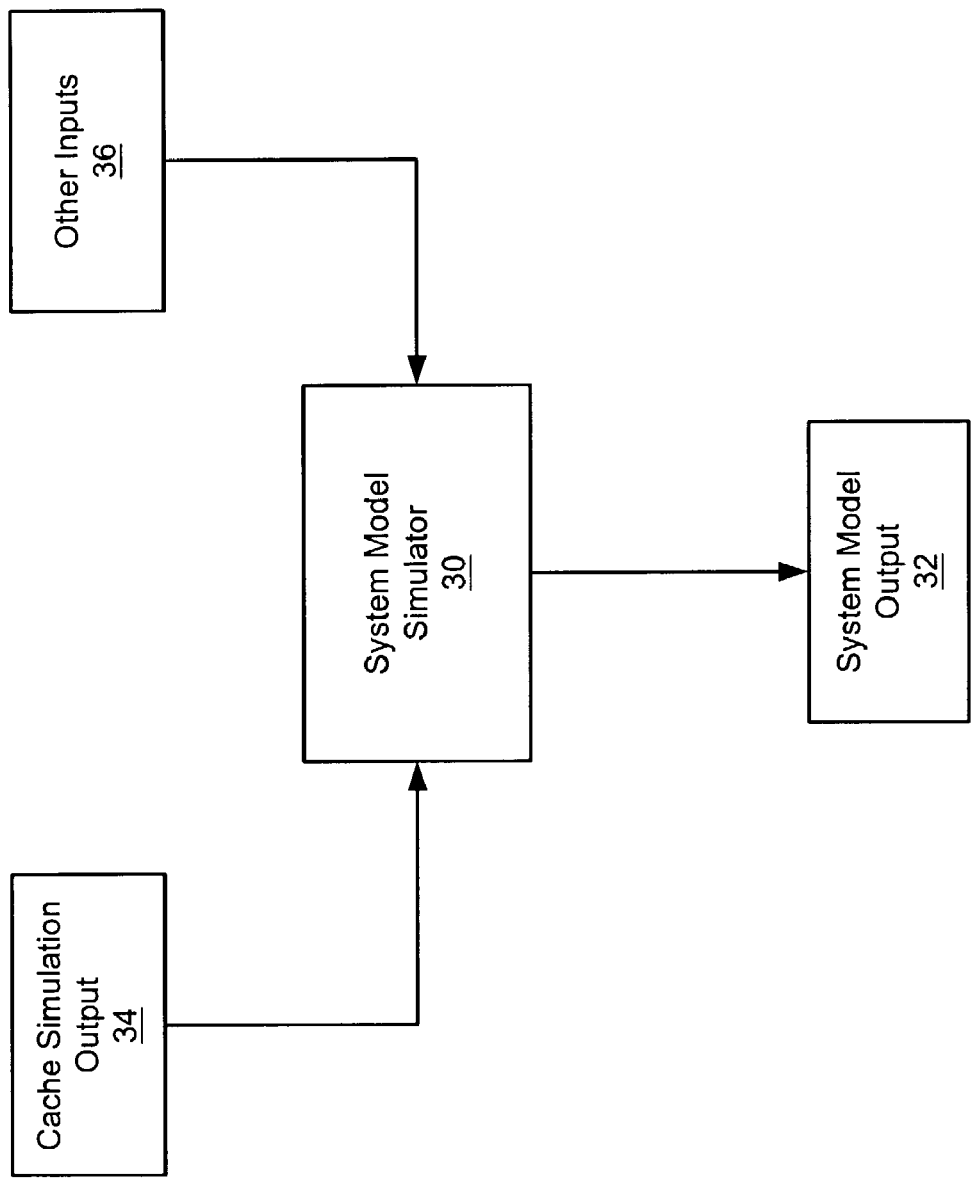
FIG. 1 illustrates a flow diagram for a typical System Model Simulator.

Exemplary embodiments of the invention will be described with reference to the accompanying drawings. Like items in the drawings are denoted by the same reference numbers throughout the figures for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method for generating an uncertainty characterization for a system simulation model. For system simulation models to aid a computer designer in predicting performance and resolving architectural tradeoffs for various system configurations, the computer designer should possess an understanding of the accuracy the system simulation model. Typically, because the system simulation model uses outputs (e.g., a cache simulation output) from other models as input, it is useful to understand and characterize the uncertainty resulting from such inputs.

Figure 2:
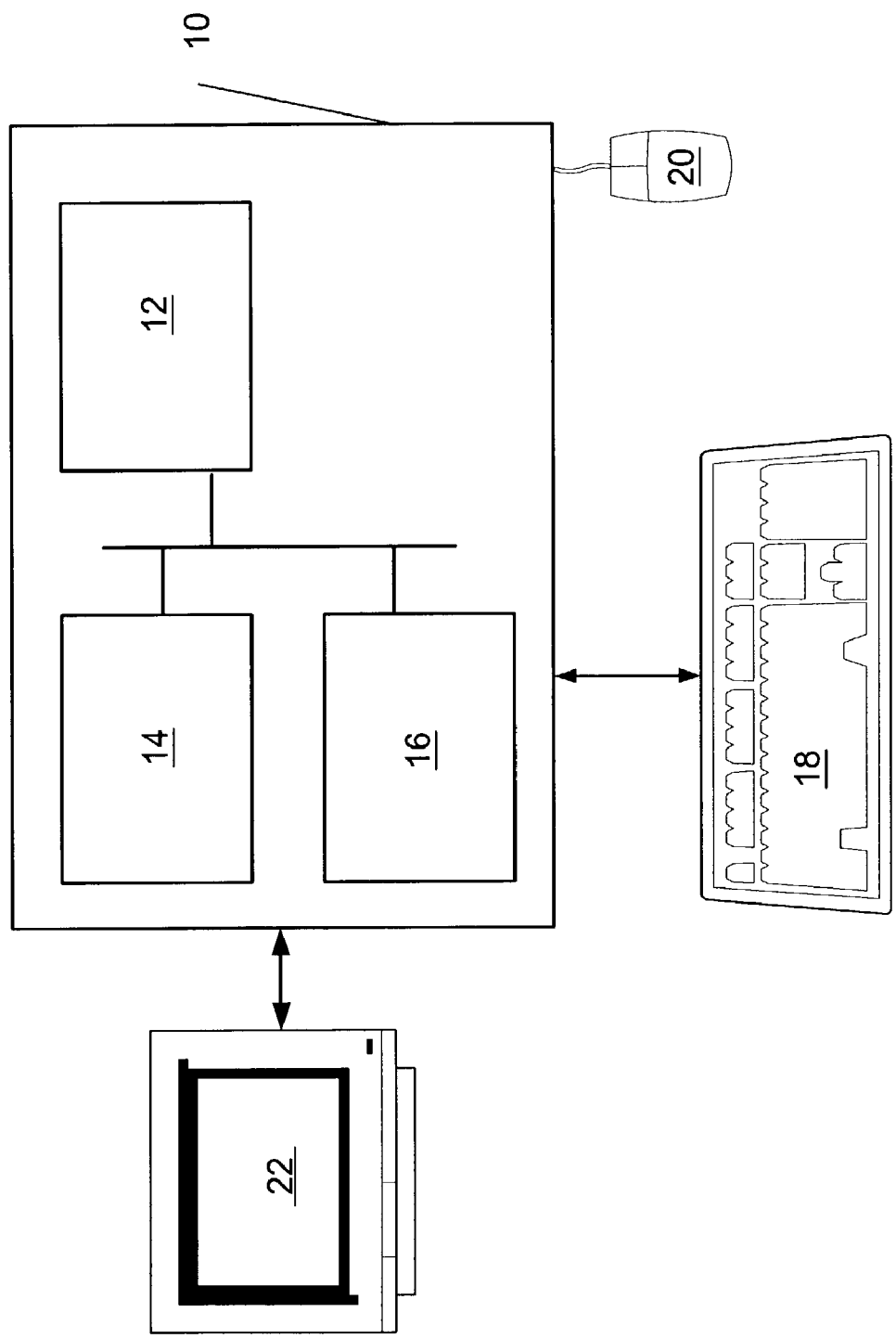
FIG. 2 illustrates a typical computer system.

The invention may be implemented on virtually any type computer regardless of the platform being used. For example, as shown in FIG. 2, a typical computer (10) includes a processor (12), associated memory (14), a storage device (16), and numerous other elements and functionalities typical of today's computers (not shown). The computer (10) may also include input means, such as a keyboard (18) and a mouse (20), and output means, such as a monitor (22). Those skilled in the art will appreciate that these input and output means may take other forms in an accessible environment.

Figure 3:
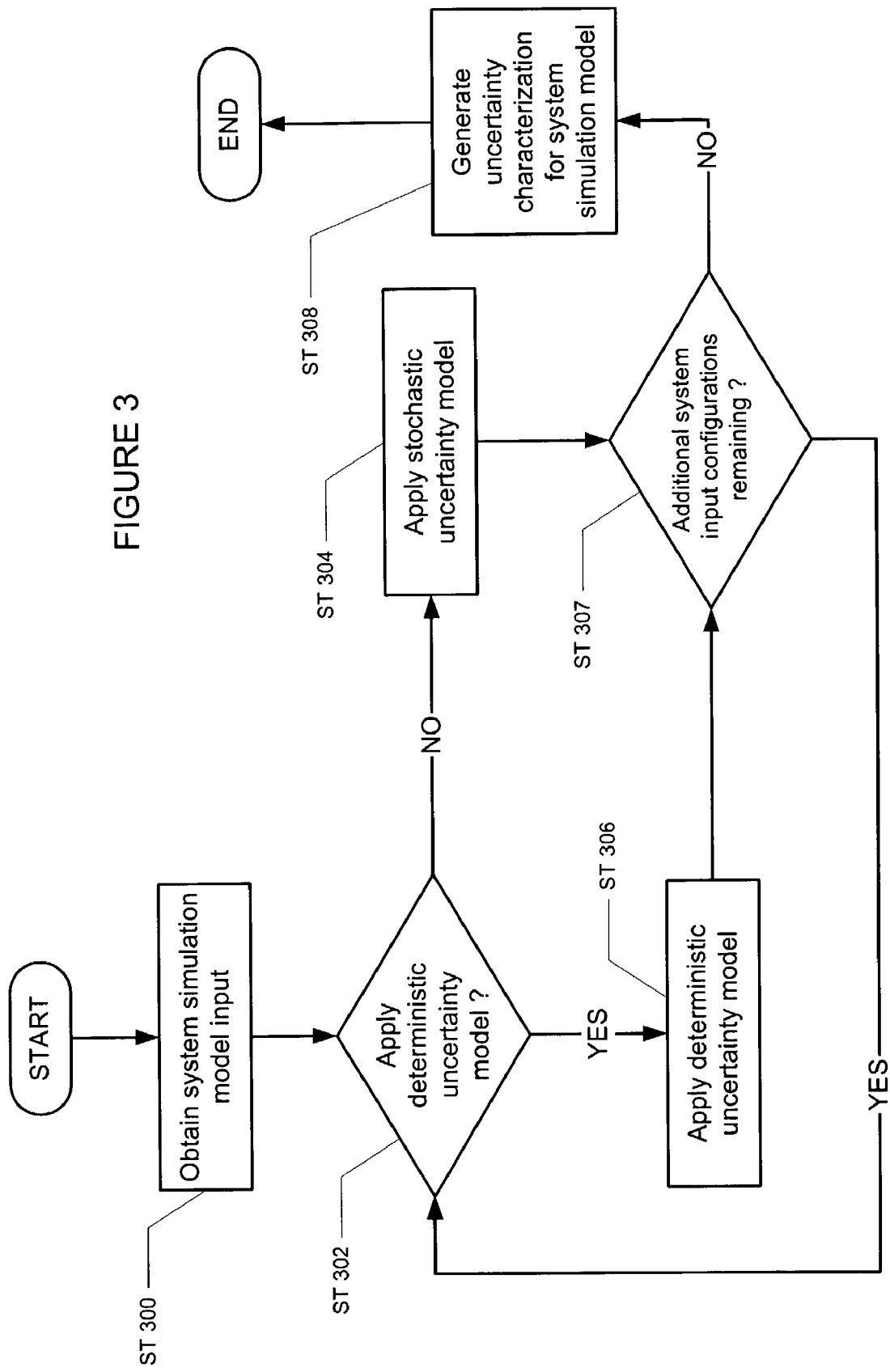
FIG. 3 illustrates a flow chart for generating an uncertainty characterization for a system simulation model in accordance with one embodiment of the invention.

FIG. 3 illustrates a flow chart for generating an uncertainty characterization for a system simulation model in accordance with one embodiment of the invention. Initially, input for the system simulation model is obtained (Step 300). The input typically includes, but is not limited, to cache simulation output (i.e., 34 in FIG. 1), hardware characteristic inputs (e.g., cache latency, memory latency, bus width, etc.), etc.

Cache simulation output is typically obtained in the form of a workload characterization model using data from a sparse simulation. The workload characterization models various multilevel cache hierarchy parameters such as miss, write back, and upgrade rates per instruction.

After the system simulation model inputs have been obtained, one determines whether to apply a deterministic uncertainty model (Step 302). If the deterministic uncertainty model is not to be applied then, a stochastic uncertainty model is applied to the system simulation input (Step 304). The application of the stochastic model to the system simulation model is defined in FIG. 4 below. Otherwise, a deterministic uncertainty model is applied to the system simulation model (Step 306). The application of the deterministic model to the system simulation model is defined in FIG. 5 below.

The stochastic uncertainty model and the deterministic uncertainty model are applied to system input configurations. The system input configuration is typically a subset of the system simulation input. For example, a typical system input configuration may include information about the number of system processors, the number of levels of cache, the coherence protocol to be used, the bus width, etc. In one embodiment of the invention, the system input configurations are obtained using a bump-hunting technique.

Returning to FIG. 3, once either the stochastic uncertainty model (Step 304) or the deterministic uncertainty model (Step 306) has been applied. One determines whether there are any additional system input configurations to which the deterministic uncertainty model or the stochastic model are applied (Step 307). If there are additional input configurations then Steps 302-306 are repeated. If there are no remaining system input configurations, then the uncertainty characterization for the system simulation model is generated (Step 308). The uncertainty characterization defines the accuracy of the system simulation model. Further, the uncertainty characterization also indicates the amount of uncertainty a particular input introduces to the system model output (i.e., 32 in FIG. 1). Those skilled in the art will appreciate that in the case where there are many system input configurations, the uncertainty models obtained for each of the system input configuration may be used to generate an uncertainty model over the entire sample space. In one embodiment of the invention, a multivariate smoother is used to generate the uncertainty model over the entire sample space.

Figure 4:
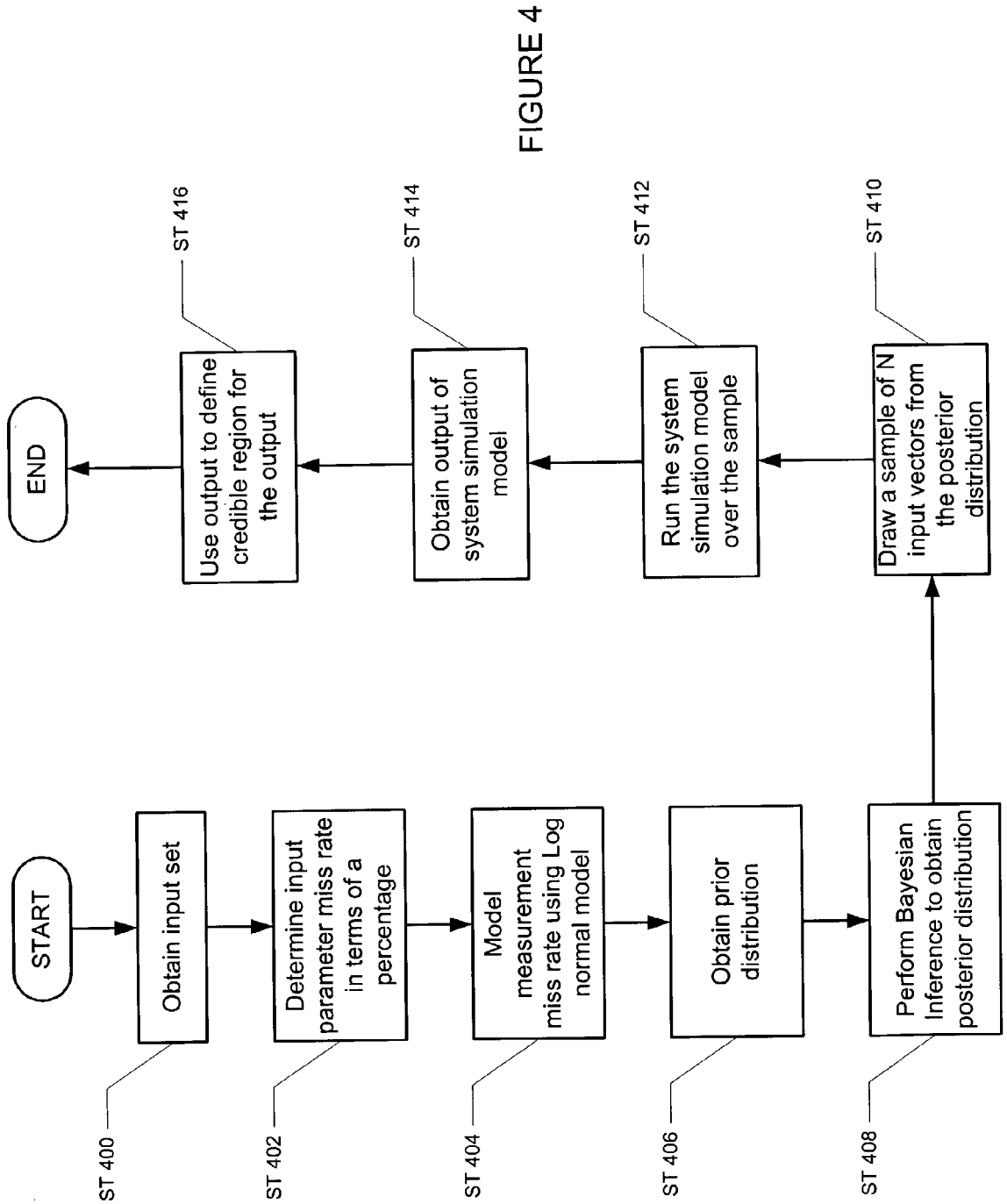
FIG. 4 illustrates a flow chart for generating a stochastic uncertainty model in accordance with one embodiment of the invention.

FIG. 4 illustrates a flow chart for generating a stochastic uncertainty model in accordance with one embodiment of the invention. Initially, an input set is obtained (Step 400). The input set typically includes, but is not limited to, cache simulation output (34 in FIG. 1), hardware characteristic input (36 in FIG. 1), etc. The input set corresponds to a set of inputs, where each input may be denoted by a vector.

The vector includes the necessary parameters that the system simulation model requires to generate system model output (32 in FIG. 1). For example, the vector may include the miss rate, the writeback rate, and the upgrade rate per instruction for each level of cache for a particular cache configuration. The measurements for the various parameters in the vector are typically generated by inputting the necessary system configuration parameters into a model and obtaining the measurement for the parameter. For example, to obtain measurements corresponding to the multilevel cache hierarchy performance parameters (i.e., miss rate per instruction, upgrade rate per instruction, etc.), a cache architecture parameter is input into the workload characterization model. Associated with each parameter of the vector is an uncertainty. Thus, if x denotes a given vector in the input set, then the distribution for vector may be denoted as $\pi(x)$.

A Bayesian Inference is then used to determine the distribution. The Bayesian Inference is an inferential model that permits the introduction of prior knowledge into the calculation of future uncertainty. Specifically, in this case, the distribution of interest for the stochastic model (i.e., $\pi(x)$) is the posterior distribution. The posterior distribution represents the probability of a result in view of uncertainty about information used to obtain the result.

To obtain the posterior distribution using the Bayesian Inference model, one determines a "likelihood" (i.e., the probability of a result assuming that the standard error and the assumptions to obtain the standard error are true) and the "prior probability" (i.e., the probability of a result given only that the assumptions are true). In determining the likelihood and the prior distribution, the invention uses the assumption that the measurement errors for each parameter (i) in the input vector (x) are independent of errors for the other dimensions.

Returning to FIG. 4, to determine the likelihood, each parameter (e.g., $x_i$) is first associated with a parameter miss rate that is defined as a percentage of the actual measurement of the parameter (e.g., 100 $\sigma_i$) (Step 402). For example, if the measured upgrade rate per instruction parameter is, on average, 10% below the actual measurement of the upgrade rate per instruction parameter, then the parameter miss rate is 10% (i.e., $\sigma_i$=0.1). A Log normal model is then fitted to the parameter miss rates for each of the parameters (Step 404). The resulting Log normal model is illustrated in Equation (1):

$$\log(X_i^m) \approx N(\log(X_i), \sigma_i^2) \tag{1}$$

where, $X_i^m$ is the measured value of the parameter; $X_i$ is the actual value of the parameter, and $\sigma_i$ is the standard error (i.e., the parameter miss rate) associated with the parameter.

Those skilled in the art will appreciate that a Log normal model was used as the parameters in the vector are restricted to be non-negative. However, it should also be clear that additional models may be used in place of the Log normal model that also restrict the parameters in the vector to be non-negative. As such, the use of the Log normal model should not limit the scope of the claims.

Returning to FIG. 4, once the likelihood has been determined, then the prior distribution is obtained (Step 406). In one embodiment of the invention, the prior distribution is obtained by modeling the input set (i.e., each parameter of the vector) as being normally distributed on a Log scale. The resulting Log model is shown in Equation (2):

$$\log(X_i) \approx \text{iid } 1_{(-\infty,\infty)} \tag{2}$$

where, $X_i$ is the actual value of the parameter, and "iid" denotes that the actual measurements are independent identically distributed around 1 from $-\infty$ to $\infty$.

Once the prior distribution has been obtained, the Bayesian Inference is used to generate the posterior distribution (Step 408). Using equation (1), equation (2), and the Bayesian Inference, the posterior distribution ($\pi(x)$) may be expressed as follows:

$$\log(X_i) \approx \text{ind} N(\log(X_i^m), \sigma_i^2) \tag{3}$$

where, $X_i^m$ is the measured value of the parameter, $X_i$ is the actual value of the parameter, $\sigma_i$ is the standard error (i.e., the parameter miss rate) associated with the parameter, and "ind" denotes that the result is independently normally distributed.

Returning to FIG. 4, once the posterior distribution has been obtained then a sample of input vectors is drawn from the posterior distribution. (Step 410). In one embodiment of the invention, the sample of the input vectors is obtained using an independent sampling technique. The sample of input vectors is then input into the system simulation model (Step 412) to obtain corresponding output from the system simulation model (Step 414). The output from the system simulation model (y) is an independent sample with a distribution ($\psi(y)$). The output distribution ($\psi(y)$) is then used for inference. Specifically, the output distribution is used to define a credible region for the output (Step 418). In one embodiment of the invention, if the output from the system simulation model is well approximated by a normal distribution, then a 95% credible region is defined by the following equation:

$$[\bar{y}-1.96\sigma, \bar{y}+1.96\sigma] \quad (4)$$

where, $\bar{y}$ represents the mean of y, and $\sigma$ represents the variance within y.

FIG. 5 illustrates a flow chart for generating a deterministic uncertainty model in accordance with one embodiment of the invention. Initially, an input set is obtained (Step 500). The input set typically includes, but is not limited to, cache simulation output (34 in FIG. 1), hardware characteristic input (36 in FIG. 1), etc. The input set corresponds to a set of inputs, where each input may be denoted by a vector. The vector includes the necessary parameters that the system simulation model requires to generate system model output (32 in FIG. 1). For example, the vector may include the miss rate, the writeback rate, and the upgrade rate per instruction for each level of cache for a particular cache configuration. The measurements for the various parameters in the vector are typically generated by inputting the necessary system configuration parameters into a model and obtaining the measurement for the parameter. For example, to obtain measurements corresponding to the multilevel cache hierarchy performance parameters (i.e., miss rate per instruction, upgrade rate per instruction, etc.), cache architecture parameters are input into the workload characterization model, to obtain the multilevel cache hierarchy performance parameters.

The input set is subsequently restricted (Step 502). The input set is restricted using a system configuration domain (D). The system configuration domain describes a particular system configuration or a narrow range of system configurations. For example, a typical system configuration may include information about the number of processors the system has, the number of levels of cache, the coherence protocol to be used, the bus width, etc.

Once the input set has been restricted (i.e., the restricted input set is obtained), a range of outputs for the system configuration domain (D) is determined (Step 504). The range of outputs for the system configuration domain (D) is determined for each parameter in the restricted input set.

In one embodiment of the invention, the range for each parameter is determined by uniformly sampling the restricted input set. Alternatively, if there is a trend in the output for a given parameter, then the appropriate portions of the system configuration domain (D) may be sampled to determine the range of outputs rather than uniformly sampling the system configuration domain (D). For example, if the miss rate parameter output is decreasing with an increase in the cache size parameter input, then only the low cache size measurements and the high cache size measurements for the parameter input need to be sampled to the determine the range of outputs.

In either case (i.e., uniform sampling or sampling in particular portions), an independent sample is drawn from the restricted input set. Depending on the size of the restricted input set, the size of the independent sample (M) set varies. Each vector $(x_i)$ in the independent sample set (M) is input into the system simulation model to generate a corresponding set of output vectors $(a_i)$. If the system simulation model is viewed as function f then the following equation may be used to described the set of output vectors $(a_i)$:

$$a_i = f(x_i), \text{ where } 1 \leq i \leq M \quad (5)$$

The minimum output measurement for the set of output vectors $(a_i)$ may then be defined as:

$$a_{(1)} = \min a_i \quad (6)$$

where $a_{(1)}$ is the minimum measurement, vector containing the minimum measurement for each parameter in the set of output vectors $(a_i)$. The maximum output measurement may be obtained in the same manner.

Once the range is determined (i.e., the minimum output measurement and the maximum output measurement are determined) for each parameter, then a bootstrap correction is performed to determine the bias associated with each minimum output measurement and the maximum output measurement (Step 506). The bootstrap correction is a procedure that involves choosing random samples with replacement from a data set and analyzing each sample the same way. Sampling with replacement denotes that every sample is returned to the data set after sampling. Thus, a particular data point from the original data set could appear multiple times in a given bootstrap sample. The number of elements in each bootstrap sample equals the number of elements in the original data set.

Thus, if M independent samples were taken from the restricted input set, then each bootstrap sample should also have M independent samples taken from the restricted input set. If B number of bootstrap samples are taken and for each bootstrap sample a minimum output measurement is determined, then the bias is defined as follows:

$$\overline{\min} - a_{(1)} = \frac{\sum \min_i}{B} - a_{(1)} \quad (7)$$

where $\overline{\min}$ denotes the average minimum output measurement over the entire set of bootstrap samples. The bias for the maximum output measurement may be obtained in a similar manner.

Returning to FIG. 5, the bias for the minimum output measurement and the maximum output measurement for the system configuration domain (D) are then used to generate the deterministic uncertainty model for the system simulation domain (D) (Step 508). In one embodiment of the invention, the bias is used in the following equation to estimate the minimum output measurement ($\min_D f$) for the system configuration domain (D).

$$\min_D f = 2a_{(1)} - \overline{\min} \quad (8)$$

A similar equation may be used to estimate the maximum output measurement for the system configuration domain.

In one embodiment of the invention, the deterministic uncertainty model may be applied to a number of system configuration domains. A multivariate model may be subsequently fitted to the deterministic model to generate an uncertainty characterization over the entire sample space.

In one embodiment of the invention, one may wish to model the entire input space using the invention described above. Initially, a sparse set of inputs representing the entire input space is drawn from the sample space. The sparse set of inputs may be obtained using an experimental design technique. Once the sparse set of inputs has been obtained, the deterministic uncertainty model or the stochastic uncertainty model may be used to generate an uncertainty model for each of the inputs in the sparse set of inputs. A multivariate fitting routine may then be applied to the uncertainty models to generate a surface that describes the uncertainty.

Further, a threshold may be applied to the surface to identify regions of high uncertainty. Alternatively, a bump-hunting technique may be applied to the uncertainty models to determine regions of high uncertainty. As noted above the regions of high uncertainty correspond, at least in part, to the uncertainty characterization described above.

The invention may have some of the following advantages. The invention provides a computer designer a means to generate a certainty characterization for the system simulation model that may be subsequently used to design a system architecture. The invention presents a way to determine an interval that covers the true performance measure with specified confidence (e.g., 95%). Thus, a computer designer knows how reliable the performance estimates are. Description of how input uncertainty translates into output uncertainty provides an indication of how accurately the inputs need to be measured to obtain reliable outputs (performance estimates). The invention determines the relative importance of accurate estimation within different regions (e.g., regions with higher miss rates have larger associated output uncertainty).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating an uncertainty characterization for a system simulation model, comprising:
    obtaining a system simulation input for the system simulation model, wherein the system simulation input comprises a cache simulation output and a hardware characteristic input;
    generating a deterministic uncertainty model using system simulation input; and
    generating the uncertainty characterization for system simulation output,
    wherein the system simulation output is generated by the execution of the system simulation model using the system simulation input,
    wherein the uncertainty characterization is determined using a deterministic uncertainty model,
    wherein the uncertainty characterization indicates an amount of uncertainty introduced into the system simulation output by the system simulation input, and
    wherein generating the deterministic uncertainty model comprises:
        restricting an input set to at least one of a plurality of system configuration domains,
        wherein the input set comprises the cache simulation output and a hardware characteristic input;
        determining a range over the restricted input set, wherein the range comprises an upper bound and a lower bound;
        determining a bias for the upper bound and the lower bound; and
        generating the deterministic uncertainty model using the bias;
        wherein the deterministic uncertainty model is then stored.

2. The method of claim 1, wherein the determining the bias comprises performing a bootstrap correction method.

3. A method for generating an uncertainty characterization for a system simulation model, comprising:
    obtaining a system simulation input for the system simulation model, wherein the system simulation input comprises a cache simulation output and a hardware characteristic input;
    generating a stochastic uncertainty model, using the system simulation input; and
    generating the uncertainty characterization for system simulation output,
    wherein the system simulation output is generated by the execution of the system simulation model using the system simulation input,
    wherein the uncertainty characterization is determined using a stochastic uncertainty model,
    wherein the uncertainty characterization indicates an amount of uncertainty introduced into the system simulation output by the system simulation input, and
    wherein generating the stochastic uncertainty model comprises:
    obtaining a posterior distribution of an input set,
    wherein the input set comprises the cache simulation output and a hardware characteristic input;
    wherein obtaining the posterior distribution comprises:
        determining a parameter miss rate as a percentage of an actual measurement of the parameter for each of a plurality of parameters in an input set,
        fitting a Log normal model to the plurality of parameter miss rates,
        obtaining a prior distribution for the input set, and
        determining the posterior distribution using the Log normal model and the prior distribution;
        obtaining a sample of input vectors from the posterior distribution;
        generating an output set using the system simulation model and the sample of input vectors from the posterior distribution;
        defining a credible region using the output set;
        generating the stochastic uncertainty model using the credible region;
        wherein the stochastic uncertainty model is then stored.

4. The method of claim 3, wherein generating the stochastic uncertainty model comprises using a multivariate smoother.

5. A computer system for generating an uncertainty characterization for a system simulation model, comprising:
    a processor;
    a memory; and
    a storage device; and
    software instructions stored in the memory for causing the computer system, under the control of the processor, to perform:
        obtaining a system simulation input for the system simulation model, wherein the system simulation input comprises a cache simulation output and a hardware characteristic input;
        generating a deterministic uncertainty model using the system simulation input; and
        generating the uncertainty characterization for system simulation output,
        wherein the system simulation output is generated by the execution of the system simulation model using the system simulation input,
        wherein the uncertainty characterization is determined using a deterministic uncertainty model,
        wherein the uncertainty characterization indicates an amount of uncertainty introduced into the system simulation output by the system simulation input, and wherein generating the deterministic uncertainty model comprises:
  restricting an input set to at least one of a plurality of system configuration domains, wherein the input set comprises the cache simulation output and a hardware characteristic input;
  determining a range over the restricted input set, wherein the range comprises an upper bound and a lower bound;
  determining a bias for the upper bound and the lower bound; and
  generating the deterministic uncertainty model using the bias.

6. The computer system of claim 5, wherein the determining the bias comprises performing a bootstrap method.

7. A computer system for generating an uncertainty characterization for a system simulation model, comprising:
  a processor;
  a memory; and
  a storage device; and
  software instructions stored in the memory for causing the computer system, under the control of the processor, to perform:
    obtaining a system simulation input for the system simulation model, wherein the system simulation input comprises a cache simulation output and a hardware characteristic input;
    generating a stochastic uncertainty model using the system simulation input; and
    generating the uncertainty characterization for system simulation output,
    wherein the system simulation output is generated by the execution of the system simulation model using the system simulation input,
    wherein the uncertainty characterization is determined using a stochastic uncertainty model,
    wherein the uncertainty characterization indicates an amount of uncertainty introduced into the system simulation output by the system simulation input, and
    wherein generating the stochastic uncertainty model comprises:
    obtaining a posterior distribution of an input set, wherein the input set comprises the cache simulation output and a hardware characteristic input;
    wherein obtaining the posterior distribution comprises:
      determining a parameter miss rate as a percentage of an actual measurement of the parameter for each of a plurality of parameters in an input set,
      fitting a Log normal model to the plurality of parameter miss rates,
      obtaining a prior distribution for the input set, and
      determining the posterior distribution using the Log normal model and the prior distribution;
    obtaining a sample of input vectors from the posterior distribution;
    generating an output set using the system simulation model and the sample of input vectors from the posterior distribution;
    defining a credible region using the output set; and
    generating the stochastic uncertainty model using the credible region.

8. The computer system of claim 7, wherein generating the stochastic uncertainty model comprises using a multivariate smoother.

* * * * *